May 5, 1925

A. SCHULZE ET AL 1,536,532

PRIMING MEANS FOR MOTOR CYCLE ENGINES

Filed April 19, 1924

H. Schulze
A. Schulze
Inventors

By Clarence A. O'Brien
Attorney

Patented May 5, 1925.

1,536,532

UNITED STATES PATENT OFFICE.

ARTHUR SCHULZE AND HARRISON SCHULZE, OF DEER PLAIN, ILLINOIS.

PRIMING MEANS FOR MOTOR-CYCLE ENGINES.

Application filed April 19, 1924. Serial No. 707,709.

*To all whom it may concern:*

Be it known that we, ARTHUR SCHULZE and HARRISON SCHULZE, citizens of the United States, residing at Deer Plain, in the county of Calhoun and State of Illinois, have invented certain new and useful Improvements in Priming Means for Motor-Cycle Engines, of which the following is a specification.

This invention relates to priming means or devices for motor-cycles, and particularly to a device operable to automatically prime the cylinders of a motor-cycle engine upon the operation of a motor control device.

An object of the invention resides in providing a valve connection with the cylinders of a motor-cycle operable to open and close the passages from a suitable form of pump adapted to force a predetermined charge of gasoline into said cylinders.

Another object of the invention is to provide pet cocks in each of the cylinders of a motor-cycle having pipes connected thereto communicating with the outlet of a pump mounted in the gasoline tank of the motor-cycle, which is operable for forcing a charge of fuel through said pipes and into the cylinders when the pet cocks are in open position, means being provided for controlling the pet cocks adapted to be opened or closed, all of said pet cocks upon the operation of a suitable manually operable lever.

The invention further includes other objects and improvements in the details of construction and arrangement of the parts, which are more particularly pointed out in the following description and claim directed to a preferred form of the invention, it being understood however, that variations may be made in this construction without departing from the scope of the invention as described and claimed.

In the drawing forming a part of this application—

Figure 1:
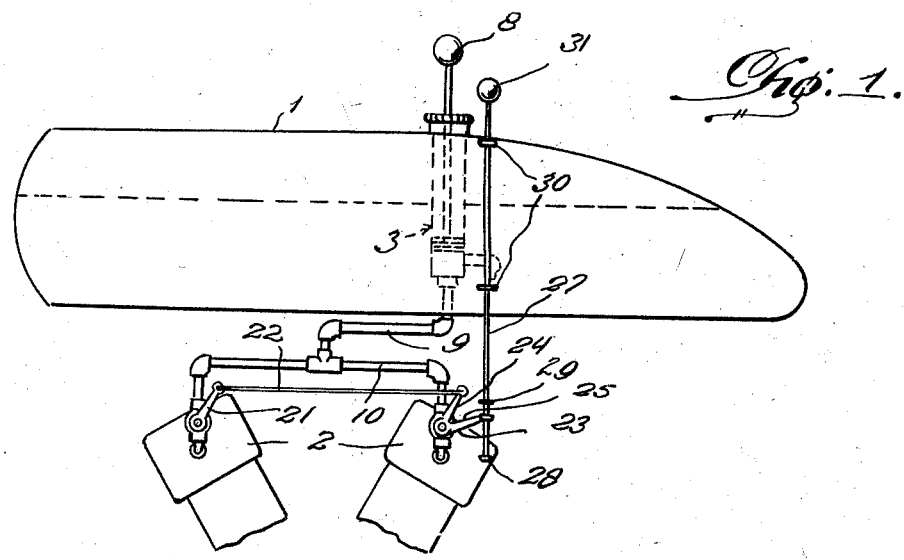
Figure 1 is a side elevational view of the gasoline tank, and a portion of the motorcycle cylinders showing the invention applied thereto.
Figure 2:
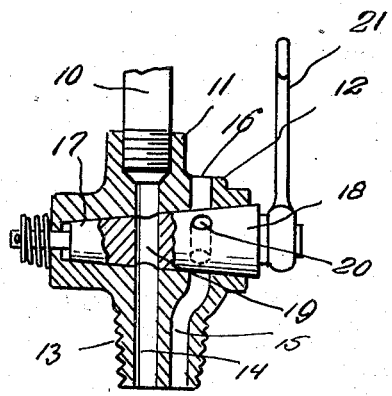
Figure 2 is a vertical sectional view through one of the pet cocks.
Figure 3:
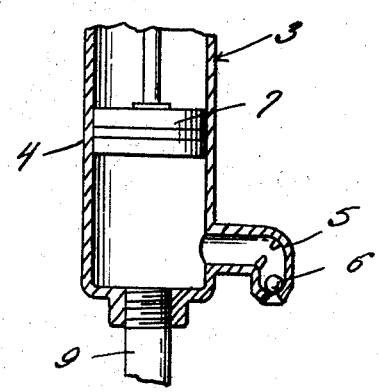
Figure 3 is a vertical sectional view through the lower end portion of the fuel pump.
Figure 4:
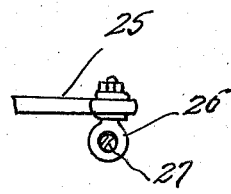
Figure 4 is a detail view on an enlarged scale, showing the manner of connecting the operating rod to the lever carried by one of the pet cocks.

1 indicates a motor-cycle gasoline tank, and 2 the cylinders of the motor-cycle engine. A fuel pump 3 has the cylinder portions 4 thereof mounted in the tank 1, and provided with an inlet 5 controlled by a suitable check valve 6 for permitting the inlet of fuel from the tank to the pump cylinder upon the operation of the piston 7 by the operating handle 8. The outlet pipe 9 of the fuel pump 3 extends through the bottom of the tank 1, and from the lower end of which extend a pair of branch pipes 10, which are connected with the bosses 11 of pet cocks 12, one pet cock being mounted in each cylinder.

The pet cock 12 is formed with an exteriorly screw threaded projection 13, and which is formed with passages 14 and 15 respectively, the passage 14 extending through the pet cock to provide communication with the branch pipe 10, while the passage 15 communicates with the atmosphere 16. The threaded projection 13 is fitted in the corresponding threaded opening in the cylinders 2 in order that both passages 14 and 15 will communicate with a combustion chamber of the cylinder. The pet cock 12 is formed with a tapered recess extending transversely of the passages 14 and 15, for receiving a tapered valve plug 18, rotatably fitted in the jaw of the pet cock and provided with passages 19 and 20, respectively, for controlling the passages 14 and 15, and adapted to be alined with the respective passages 14 and 15 for controlling the communication between the passages at opposite sides of the valve plug. One of the valve plugs is provided with an operating lever 21 connected by a link 22, through a V-shaped operating lever 23 mounted on the plug of another pet cock, the arm 24 of said operating lever 23 being arranged in a corresponding angular relation with the arm 21, while the arm 25 of said operating lever receives an eye member 26, through which slidably extends the operating rod 27. Stops 28 and 29 are mounted on the operating rod 27 at each side of the eye member 26, and in spaced relation thereto, adapted in the operation of the rod member to operate the lever 23. The rod 27 is slidably mounted in guides 30 on the outside of the gasoline tank 1, and at the upper end is provided with a handle 31, which is in convenient reach of the operator of the motor-cycle, and through which the operation of the valve plugs 18 is effected.

With a construction of this character, the cylinders 2 may be primed by drawing the handles 8 and 31 of the fuel pump 3 and the operating rod 27 upwardly at the same time, which will operate to supply the cylinder 4 with a charge of fuel, while the operating rod 27, the lever connections 21 and 23 and the link connection 22 will rotate the valve plugs 18 to provide communication of the combustion engine of the cylinder with the atmosphere for exhausting compressed gas in the cylinders.

Following this, a downward movement of the handles 8 and 31, is effected which will operate the rod 27 for rotating the valve plugs 18 to aline the passage 19 with the passage 14, so that the downward movement of the pump piston 7 will force the charge of gas contained in the cylinder 4 through the pipe connections 9 and 10 and supply a charge of priming fuel to the cylinders 2. After the rod 27 is moved to its lower limit, the stop 29 will engage the operating lever 23, for rotating the valve plugs 18 to close the passages 14, and 15, after which the motor-cycle engine may be easily started.

From the above description, it should be readily appreciated that a simple and convenient form of priming device has been provided for motor-cycles, which is easily operable for priming the cylinders of the motor-cycle simultaneously in a single operation of the handles 8 and 31.

Having thus described our invention, what we claim as new, and desire to secure by Letters Patent, is:

A structure of the class described comprising a manually operated pump including a cylinder and plunger reciprocable therein, a valved intake connected with said cylinder, and a discharge pipe leading from the bottom of the cylinder, oppositely extending branch pipes connected with said discharge pipe, pet cocks to which the outer ends of said branch pipes are connected, said cocks including a casing provided with parallel bores, the branch pipe communicating with one bore, and the other bore constituting an air passage and being open to the atmosphere, a rotary turn plug in each casing, said plug being provided with ports in registry with each of said bores, a crank arm connected with one turn plug, a bell crank connected with the other turn plug, a link connecting said arm and one of the arms of the bell crank, and an operating rod connected to the remaining arm of the bell crank.

In testimony whereof we affix our signatures.

ARTHUR SCHULZE.
HARRISON SCHULZE.